Sept. 24, 1957    E. FERMI ET AL    2,807,727
NEUTRONIC REACTOR SHIELD
Filed Jan. 16, 1946    2 Sheets-Sheet 1

Witnesses:
Herbert E. Metcalf
Richard E. Burn

Inventors:
Enrico Fermi
Walter H. Zinn
By Robert A. Lavender
Attorney

Sept. 24, 1957  E. FERMI ET AL  2,807,727
NEUTRONIC REACTOR SHIELD
Filed Jan. 16, 1946  2 Sheets-Sheet 2

Witnesses:
Hubert E. Metcalf
Richard E. Burn

Inventors:
Enrico Fermi
Walter H. Zinn
By Robert A. _____
Attorney

United States Patent Office 2,807,727
Patented Sept. 24, 1957

2,807,727
NEUTRONIC REACTOR SHIELD

Enrico Fermi, Santa Fe, N. Mex., and Walter H. Zinn, Chicago, Ill., assignors to the United States of America as represented by the United States Atomic Energy Commission Application January 16, 1946, Serial No. 641,625

2 Claims. (Cl. 250—108)

This invention relates to radiation shielding devices and more particularly to a radiation shield that is suitable for protection of personnel from both gamma rays and neutrons.

In the operation of certain devices known as neutronic reactors a neutron fissionable isotope such as $U^{233}$, $U^{235}$, or plutonium $^{239}$ or mixtures thereof is subjected to fission by absorption of neutrons and a self-sustaining chain reaction is established by the neutrons evolved by the fission. In general such reactors comprise bodies of compositions containing such fissionable material, for example, natural uranium, disposed in a neutron slowing material which slows the neutrons to thermal energies. Such a slowing material is termed a neutron moderator. Carbon, beryllium, and $D_2O$ (heavy water) are typical moderators suitable for such use. Specific details of the theory and essential characteristics of such reactors are set forth in copending application of Enrico Fermi and Leo Szilard, Serial No. 568,904, filed December 19, 1944, now Patent No. 2,708,656.

In the operation of a neutronic reactor, a large quantity of neutrons and gamma rays as well as alpha and beta rays are released. It is essential that personnel working around said reactors be protected from these types of radiation as they have detrimental biological effects.

Therefore, it is an object of this invention to provide a device that will protect personnel from radiations, especially all types of radiation which emanate from a neutronic reactor.

Another object of the invention is to provide a type of shielding that will be easy to construct, simple to assemble, low in cost, and occupy a relatively small space.

These and other objects are obtained by the novel construction, combination of materials, and arrangement of said materials hereinafter described and shown in the accompanying drawings in which.

Figure 1:
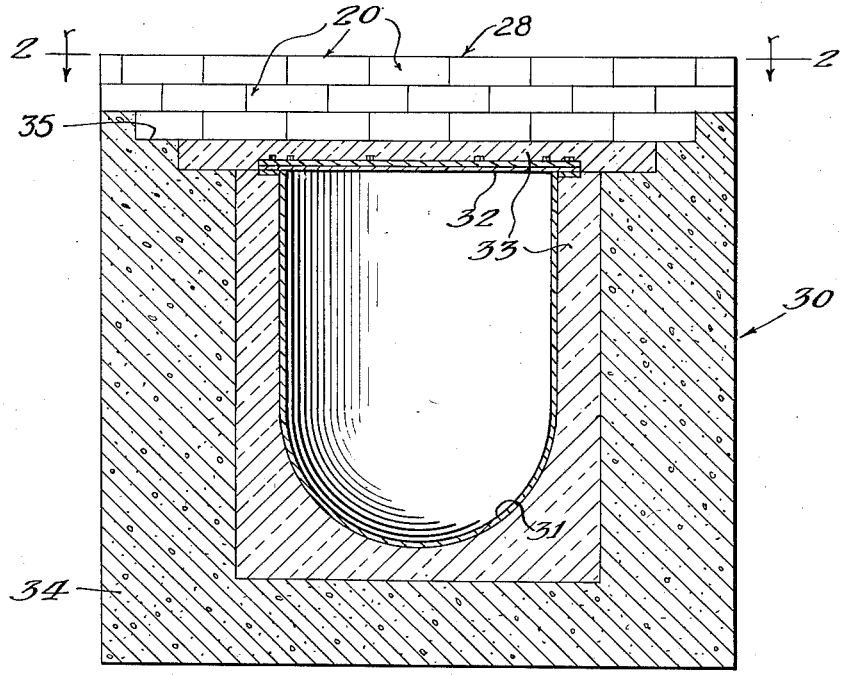
Fig. 1 is a vertical sectional view through the center of a neutronic reactor equipped with a shield constructed in accordance with the teachings of the present invention, the shield being shown diagrammatically.

In the past, gamma rays have been absorbed according to well established principles by shields of metal, usually lead, but these shields are inadequate for the absorption of fast and slow neutrons. Neutrons may be absorbed by very thick shields of concrete, but the mass of such a shield makes it unwieldy, if it must be moved in operation of the reactor. Some of the neutrons emanating from a neutronic reactor known as "fast" neutrons may have energies over one million electron volts. These fast neutrons are not readily absorbed by any single material; but it has been discovered that by using a composite shield of a neutron slowing material, also called a moderator, and a neutron absorbing material, it is possible to reduce the amount of radiation passing through said shield to a point at which it is safe for personnel to work close to the outside of said shield even when a neutronic reactor is operating at a high power output of 100,000 kilowatts or more inside of said shield. To be equally effective in stopping radiations, a concrete shield would have to be 3 to 4 times as thick as the described composite shield.

Light elements are suitable for the moderating material in such a shield because they tend to slow the fast neutrons to thermal energies by means of elastic collisions. A fast neutron colliding with the nuclei of light elements in a series of collisions gradually loses its speed until it reaches thermal energy. Light elements such as carbon, beryllium, or deuterium, are suitable for use as a slowing material, but they do not absorb either fast or slow neutrons to a high degree and they are all comparatively expensive; therefore, it is preferred to use a hydrogen-containing material, hereinafter called a hydrogenous material, for the slowing material in the shield. Hydrogen is a relatively good absorber of slow neutrons as well as a moderator of fast neutrons and is readily available in the form of hydrocarbons, cellulose or water. It will be understood that hydrogen has the same moderating and absorbing qualities in the form of an element or combined in a compound.

When the fast neutrons have been slowed by the slowing material to the thermal energies, they are readily absorbed by materials such as boron, cadmium, gadolinium, samarium and iron. Any one of several materials could be used with the slowing material to form a shield but it is preferred to use an iron-containing material, because it is cheap and a good absorber of gamma rays. Iron in the form of steel is very advantageous because it has high structural strength; and it has a relatively high capture cross-section for thermal neutrons and therefore is a good absorber of thermal neutrons. Iron is also more effective than most metals in slowing fast neutrons by means of inelastic collisions. In these collisions the neutron's energy is used up in producing an excited state of the iron nucleus, which later emits the energy as a gamma ray. For this reason the iron will act as a moderator as well as an absorber.

As has been mentioned, iron is also a good absorber of gamma rays. This is an essential feature because the absorption of a neutron by an iron nucleus causes the emission of a gamma ray of approximately two million electron volts energy. As has been explained above, said gamma rays are dangerous to personnel and therefore said rays must be absorbed by the shield. A proper thickness of iron will absorb said gamma rays.

In a preferred embodiment of the present invention, the iron is contained in the form of steel sheets and the hydrogenous material is in the form of a wood-fibre board such as Masonite. (Masonite is a hydrolized ligno-cellulose material compressed under heat.) A Masonite board which contains about 6 percent hydrogen and has a density of about 1.3 grams per cubic centimeter has been found satisfactory. The steel sheets and the Masonite boards are assembled in several alternate layers to form sections of the shield. Thus, a fast neutron entering the shield is slowed to thermal energy either by inelastic collisions with the iron nuclei in which the neutron energy is used up in producing an excited state of the iron nucleus or it may be slowed by elastic collisions with the light nuclei such as hydrogen and carbon contained in the wood fibre. Upon reaching thermal energies the neutron is readily absorbed by an iron nucleus or it may possibly be absorbed by a hydrogen nucleus.

Since both steel and Masonite have excellent structural qualities, a shield composed of layers of these materials is very strong mechanically and may be self-supporting.

Figure 3:
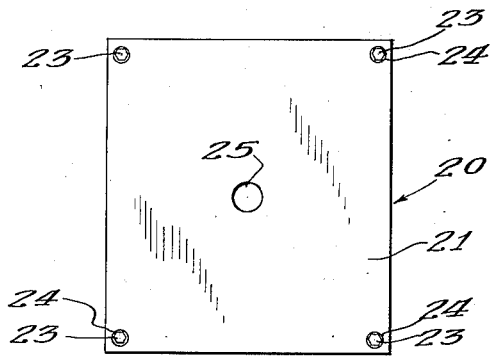
Fig. 3 is an enlarged plan view of one section of the shield shown in Figs. 1 and 2.
Figure 4:
Fig. 4 is an elevational view of the shield section shown in Fig. 3.
Figure 6:
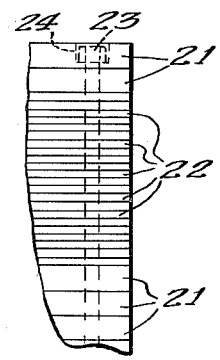
Fig. 6 is an enlarged fragmentary elevational view of the shield section shown in Fig. 4.

Turning now to the drawings, one exemplication of a layered shield of alternate sheets of steel and Masonite is shown. In Figs. 3, 4, and 6, one section 20 of such a shield is disclosed. Reading from top to bottom of Fig. 4 the section 20 is composed of two sheets 21 of steel, each ¾ of an inch thick, then twenty-two sheets 22 of Masonite each ⅛ of an inch thick, then four sheets 21 of steel each ¾ of an inch thick, then another twenty-two sheets 22 of Masonite each ⅛ of an inch thick, and finally two sheets 21 of steel each ¾ of an inch thick. Thus the total assembly is 11½ inches in thickness. The dimensions given above are to be taken as illustrative. The assembly is secured together by four bolts 23 positioned at the corners of each sheet and passing through each sheet. The heads of the bolts 23 are countersunk in depressions 24 in the upper and lower sheets so that the heads are flush with the surface of upper and lower sheets 21. A threaded hole 25 is provided in the center of the upper steel plate 21 in which an eye bolt may be screwed for use in positioning the section in place in the shield. For clarity, the individual sheets 22 of Masonite are not indicated in Fig. 4, but are in Fig. 6.

Figure 2:
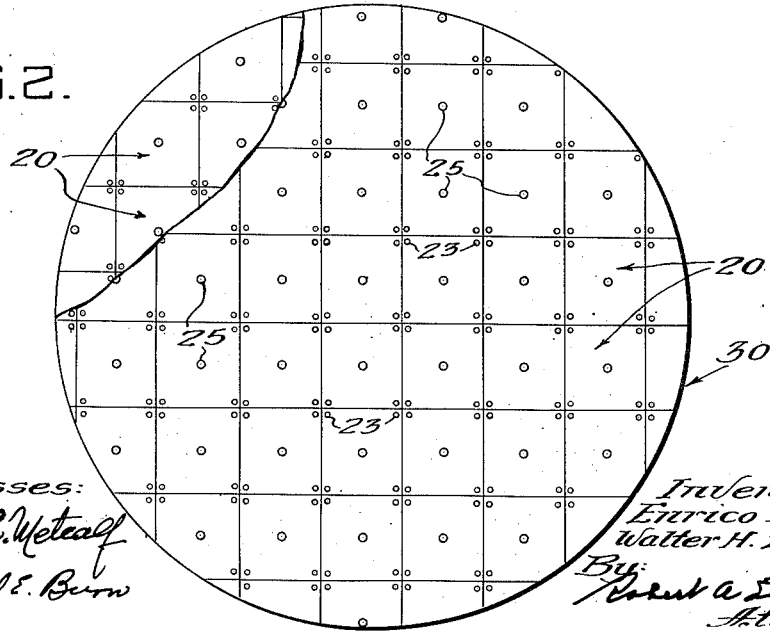
Fig. 2 is a plan view of the neutronic reactor and shield shown in Fig. 1, part being broken away to show the top construction of the shield.

Figs. 1 and 2 disclose diagrammatically three layers of shield sections 20 laid in place as the upper shield 28 of a neutronic reactor 30. The reactor 30 shown is a deuterium oxide moderated type in which uranium (not shown) is suspended in an aluminum tank 31 partially filled with deuterium oxide (not shown). Such a reactor is fully described in the Fermi-Szilard patent mentioned above. The reactor tank 31 is provided with a heavy metal top 32 from which the uranium in the form of long rods is suspended. At intervals in the operation of the reactor 30, it is necessary to remove this top 32 and with it the uranium rods in order that said rods may be replaced. Therefore, it is essential that any shielding placed over the reactor top 32 must be easily removable.

A neutron reflector 33 of graphite surrounds the tank 31 on all sides including bottom and top. A heavy concrete shield 34 may surround the sides and bottom of the tank 31 or the present improved shield may be used. Since weight is of little moment on the sides and accessibility is not necessary, the concrete side shield may be made several times as thick as the top layered shield. The concrete shield should be at least three times as thick to give equivalent protection. The upper wall of the side shield 34 is formed into steps 35 for supporting the exterior sections 20 of the top shield 28. As shown in the drawings, the first layer of shield 28 is laid above the reactor 30 with the edges of the sections 20 aligned. The second layer is then laid so that each section 20 is centered over the intersection of four sections 20 of the lower layer (Fig. 2). Thus, the spaces between sections 20 are effectually blocked by alternate layers so that there is no clear path for neutrons or other radiations to escape through the shield 28. Each neutron or ray which passes through the spaces of one layer of the shield is absorbed by the second layer which covers said spaces. It will be understood that the number of layers of sections 20 used will depend upon the intensity of the radiation being emitted by the source to be shielded. This adaptability to various conditions is one of the principal advantages of the invention, because the shield 28 may be easily designed to fit a specific condition.

Figure 5:
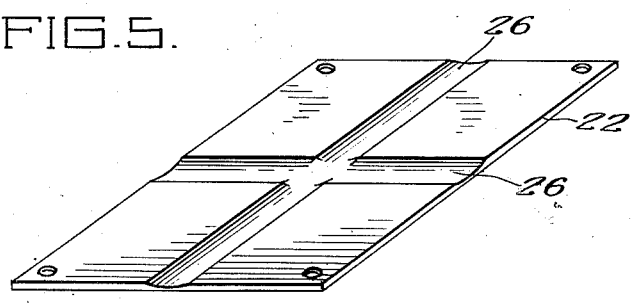
Fig. 5 is a perspective view of one sheet of the hydrogenous material of the shield shown in Figs. 3 and 4.

It will be noted that a substantial thickness of steel is provided in the exterior layers of the section 20. Thus when the section 20 is positioned on a reactor 30, the interior sheets next to the reactor are of steel and the exterior sheets are also of steel. A fast neutron escaping from the reactor 30 first passes through iron before reaching the hydrogenous material. This is important because under a high concentration of neutron bombardment the hydrogenous material tend to dissociate releasing hydrogen and other gases. By placing the steel adjacent the source of neutrons enough neutrons are absorbed by the iron nuclei so that the number of neutrons striking the hydrogenous material is considerably reduced and the possibility of dissociation is lessened. As shown in Fig. 5 transverse grooves 26 are provided in each Masonite board 22 so that any gas evolved in said board may escape to the exterior without causing warping of said board.

The exterior thickness of iron is required as explained above because gamma rays originate in the shield when a neutron is absorbed. The exterior layer of iron reduces the quantity of gamma rays escaping to a safe amount.

The structure and configuration of the shield sections 20 and of the shield 28 may be changed, and other arrangements of the hydrogenous material and the dense material may be used without departing from the spirit of the present invention. The arrangements and dimensions of the hydrogenous and dense materials have been given by way of examples and will vary depending on types of materials used and the shielding job to be accomplished. The above disclosure is to be regarded as descriptive and illustrative only, and not as restrictive of the invention which is limited only by the appended claims.

It is claimed:

1. In combination with a neutronic reactor, a radiation shield adjacent said reactor, said radiation shield comprising a plurality of layers of shielding blocks, each of said blocks comprising a plurality of layers of an iron-containing material and a compressed cellulosic material secured together in the following order, first a layer of said iron-containing material approximately one and one-half inches in thickness, then a layer of said cellulosic material approximately two and three-quarters inches in thickness, then a second layer of said iron-containing material approximately three inches in thickness, then a second layer of cellulosic material approximately two and three-quarter inches in thickness and finally a third layer of said iron-containing material approximately one and one-half inches in thickness.

2. The radiation shield as described in claim 1 wherein each of said layers of cellulosic material comprises flat sheets, each of said sheets being provided with a transverse groove in its surface, said groove extending to at least one edge of the sheet.

References Cited in the file of this patent

UNITED STATES PATENTS

| | | |
|---|---|---|
| 710,201 | Lowder | Sept. 30, 1902 |
| 1,580,857 | Richards | Apr. 13, 1926 |
| 1,844,512 | Mains | Feb. 9, 1932 |
| 2,183,790 | Dillehay | Dec. 19, 1939 |
| 2,708,656 | Fermi et al. | May 17, 1955 |